Figure 1:
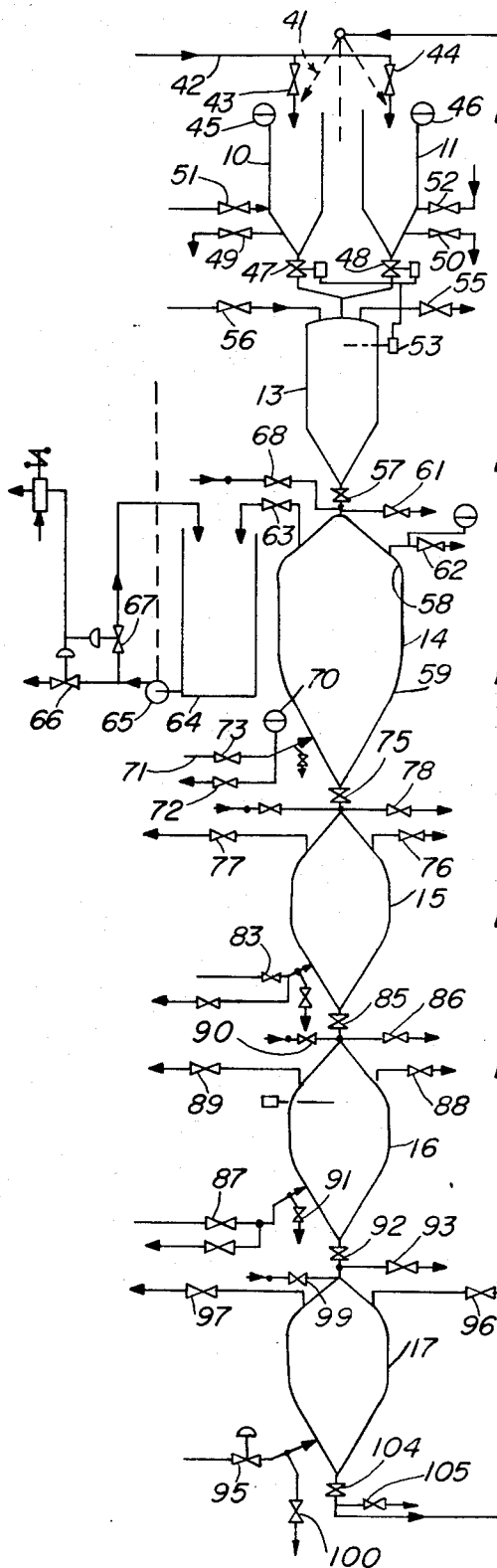

United States Patent [19]
Zievers

[11] 3,768,650
[45] Oct. 30, 1973

[54] CONTINUOUS ION EXCHANGE SYSTEM
[75] Inventor: James F. Zievers, La Grange, Ill.
[73] Assignee: Industrial Filter & Pump Mfg. Co., Cicero, Ill.
[22] Filed: Aug. 16, 1971
[21] Appl. No.: 172,192

Related U.S. Application Data
[63] Continuation of Ser. No. 785,143, Dec. 19, 1968, abandoned.

[52] U.S. Cl. ................................ 210/140, 210/189
[51] Int. Cl. ............................................ B01d 33/20
[58] Field of Search ...................... 210/189, 33, 139, 210/140

[56] References Cited
UNITED STATES PATENTS
3,512,639  5/1970  Kugelman et al. ............... 210/189 X
3,298,791  1/1967  Meyer et al. ...................... 210/189 X
3,056,743  10/1962  Eichhorn et al. ................ 210/189 X
3,459,306  8/1969  Kanamuri et al. .................. 210/189

Primary Examiner—Frank A. Spear, Jr.
Attorney—Fidler, Patnaude & Batz

[57]  ABSTRACT

A continuous ion exchange regeneration system includes an ion exchange column in the main process line and a plurality of other interconnected columns, all of which columns are filled with resin at all times. Periodically, small quantities of resin are forced from column to column by the application of pulses of pneumatic pressure to a sealable, resin feed column positioned above the ion exchange column.

8 Claims, 2 Drawing Figures

PATENTED OCT 30 1973 3,768,650

INVENTOR.
JAMES F. ZIEVERS

BY Fiedler, Bradley & Patenaude

ATTYS.

CONTINUOUS ION EXCHANGE SYSTEM

This application is a continuation of application, Ser. No. 785,143 filed by me on Dec. 19, 1968 and now abandoned.

The present invention relates to a method and system wherein a liquid is treated by passing it through a granular sorbent, and it relates more particularly to a continuous ion exchange system wherein the sorbent is an ion exchange resin.

A sorbent is a substance having an active surface area which sorbs, meaning to take up and hold either by adsorption or absorption. Exemplary of sorbent substances are those substances which are known as adsorbents, and capable of holding and retaining gases, liquids or dissolved substances. This property is commonly referred to as adsorption and is generally thought to be due to an adhesive attraction between the adsorbent and the adsorbate or the material to be adsorbed. A number of adsorbent compounds are known, a few of which, for example, are charcoal, clay, silica gel, and the like. These compounds are useful, for example, for such purposes as purifying agents, humidity-controlling agents, anti-corrosion agents and catalysts.

Another example of a sorbent can be found in that class of substances commonly referred to as absorbents, which are those substances able to take in gases or liquids and hold them by cohesion or capillary action.

Sorbent substances depend for their effectiveness upon the large active surface areas, both external areas and pore areas, which they present to the sorbate or to the substance to be sorbed. With ion exchange materials, it is also important that contaminants removed by the exchange material during its service cycle can be desorbed so that the spent material can be regenerated completely.

Several features of the present invention find application in other processing systems wherein a sorbent such, for example, as activated carbon or other granular material must be moved from one tank to another or from one location in the system to another. Consequently, although the present invention is described herein in connection with an ion exchange system of the so-called continuous type, the invention is not so limited nor should it be so narrowly construed.

Continuous ion exchange systems and processes have been known for many years, and they normally employ an ion exchange tank connected both in the main process line and in a regeneration loop through which the resin is passed for treatment with a suitable regenerant. In these systems the spent resin in the ion exchange tank is periodically and frequently replaced with fresh resin from the regeneration loop. Although the flow of the liquid to be treated may be periodically interrupted during the exchange of resin in the ion exchange tank, the periods of interruption are relatively small, and therefore, the flow of liquid through the tank is substantially constant. Moreover, the resin regeneration process may continue uninterrupted while the system is operating even though the resin being regenerated is intermittently introduced and withdrawn from the regeneration loop.

Ion exchange systems of this general type have found particular application as water softeners in municipal water supply systems and as demineralizers in industrial applications. Accordingly, these systems are ordinarily characterized by high flow rates and a large capacity whereby large quantities of resin are required and must be transported through the regeneration loop.

In order to transport the ion exchange resin through the regeneration loop and more particularly into and out of the ion exchange tank or column, the prior art systems have diverted a portion of the liquid under treatment from the main stream and fed it into the regeneration loop. The diverted liquid thus carries resin from the column into and at least partially through the regeneration loop. In regard to the operation of this prior art system, two main disadvantages have resulted from the use of the main stream liquid for carrying the resin into or through the regeneration loop. Firstly, the substantial portion of the main stream liquid which is diverted into the regeneration loop is either lost or must be retreated. This diverted portion of the main stream liquid is called "slip" and is expressed as a percentage of the amount of liquid entering the treating or ion exchange tank. Secondly, the periodic reversal of the direction of liquid flow in the ion exchange tank and in other tanks in the regeneration loop causes severe oscillation of the resin with a consequent breakdown of the resin granules and a substantial rate of attrition of the resin. Another disadvantage of some of these prior art systems is the tendency of the liquid to form channels in the portion of the resin body adjacent to the liquid inlet where the main flow reversal takes place. Various attempts have been made, of course, to lessen these inherent disadvantages of this type of system, but they have not been entirely successful. For example, a slip of 30 percent and an attrition rate of 10 percent in six months of use are not uncommon.

In addition to the above discussed operating disadvantages, another disadvantage of the prior art systems has been the large sizes of pipe which must be used to transport the liquid and the resin from the ion exchange tank. Also, settling tanks or other separators are required to separate the main stream liquid from the resin after the resin has been removed from the ion exchange tank.

It has been recognized in this art that a so-called plug flow of resin through the system is most efficient. With plug flow, the entire body of resin is moved as a unit without any appreciable intermingling of the various layers of resin. This is important since the portion of resin being removed from the ion exchange tank is that which has become exhausted and any intermixing of the exhausted resin with the still usable resin is, of course, undesirable. In a system where the freshly regenerated resin is at the top and the spent resin is at the bottom it will be apparent that the effectiveness of the resin to remove ions from the main stream liquids decreases gradually from the top to the bottom of the tank.

It is also important that there be no places within the ion exchange tank where the resin remains stationary. Such places are commonly referred to as dead areas. In the case of simple water softeners the disadvantage of dead areas within the ion exchange tank is that the entire capacity of the tank is not being used. Where, however, the system is used for demineralizing an organic material such, for example, as sugar syrups, such dead areas permit undesirable bacterial growth and a consequent contamination of the sugar bearing liquid which is passed through the ion exchange tank for treatment.

Therefore, an object of the present invention is to provide a system for moving granular materials such as sorbents through a process line.

Another object of the present invention is to provide a new and improved ion exchange system.

A further object of the present invention is to provide a continuous ion exchange system wherein the slip and attrition are improved over those systems of the prior art.

Figure 2:
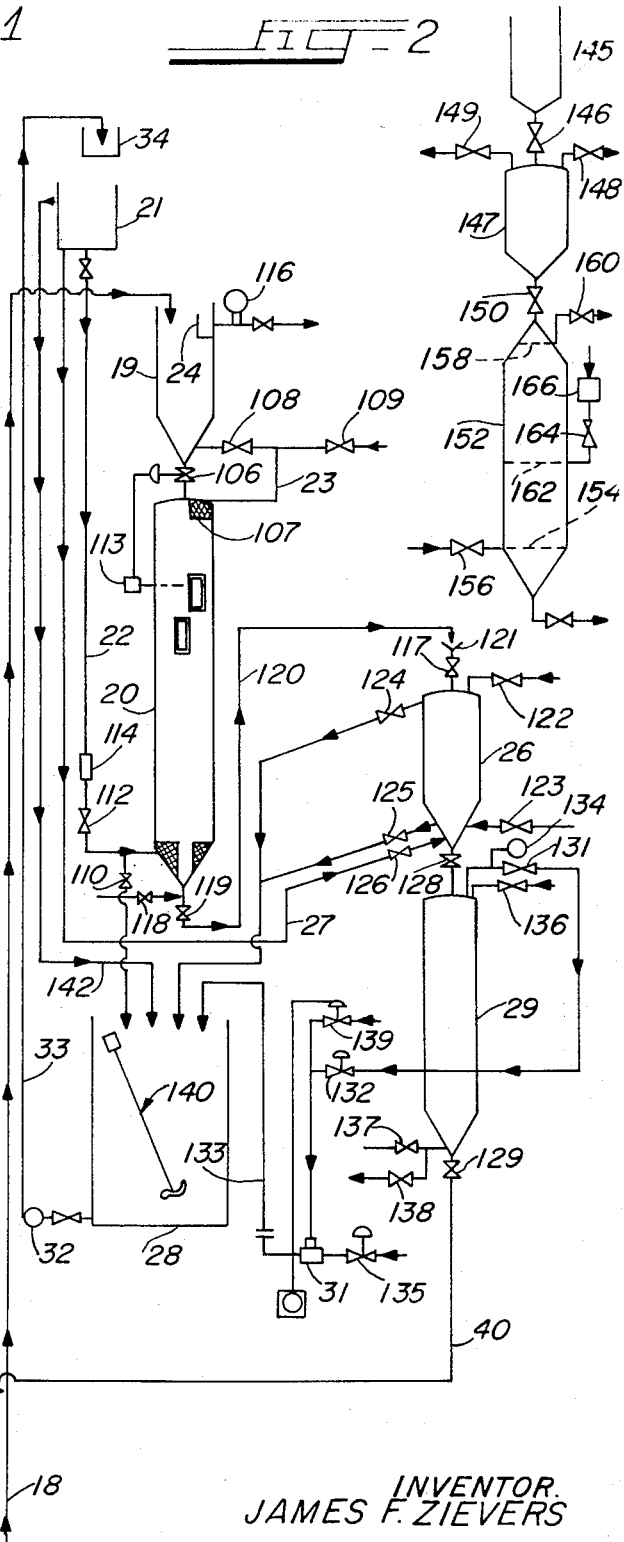

Further objects and advantages and a better understanding of the present invention may be had by reference to the following detailed description taken in connection with the accompanying drawings, wherein:

FIG. 1 is a schematic flow diagram of an ion exchange system embodying the present invention; and FIG. 2 is a schematic diagram of a portion of the regeneration loop of an alternative embodiment of the invention.

In FIG. 1 there is illustrated the cation exchange portion of a demineralizer which also includes an anion exchanger. Since, however, the anion exchange loop is substantially the same in construction and operation as the cation loop, except as hereinafter pointed out, only the cation exchange portion of the demineralizer is described in detail. Moreover, before considering this system in detail, it might be helpful to a better understanding of the invention to breifly consider in a general way the overall cation exchange loop including the resin regeneration loop which is associated therewwith.

Since the deionization of sugar bearing liquids or syrups is a particularly difficult operation as compared, for example, to softening water, and since the system of the present invention and various features thereof find application in a system for deionizing sugar bearing liquids, such a system is shown in FIG. 1. In this system fresh resin is alternately fed by gravity from a pair of resin conditioning tanks 10 and 11 to a sealable and pressurizable feed column 13 from which it is periodically forced under pneumatic pressure into the main processing tank or column 14 which, in this case, is an ion exchange column. The column 14 is connected into the main processing system or line so that the liquid flowing through that main process loop necessarily flows through the ion exchange tank 14. As this main stream of liquid passes through the cation exchange resin contained in the column 14, the cations therein are replaced with $H^+$ ions which are later removed from the main liquid in any one of several well known ways. At the time that the fresh resin is forced under pressure from the feed column 13 into the main treating column 14, spent resin is forced from the bottom of the column 14 into a sweetening-off column 15 through which water is passed in order to remove a substantial portion of the sugar bearing liquid or syrup from the resin contained in the tank 15. The effluent from the column 15 is, therefore, a diluted sugar solution from which the sugars can be economically extracted.

As the spent resin is forced into the top of the column 15 is displaces an equal amount from the bottom which thus is forced into the top of a column 16 wherein the pH of the resin and accompanying liquid is adjusted by treatment with spent ammonia regenerant from the "anion loop" and the metallic ions are replaced with ammonium ions. When the spent resin is forced under pressure into the top of the column 16 an equal amount of resins is forced from the bottom thereof into the top of a rinsing column 17 wherein the resin is rinsed by the passage of soft water upwardly therethrough. The resin which is forced through the bottom of the column 17 when resin is forced therein from the column 16 moves under pressure through a pipe 18 and falls by gravity into an elevated tank 19. The tank 19 thus contains the spent resin which is ready to be regenerated with an acid regenerant which restores the $H^+$ ions to the resin in place of the cations which were adsorbed thereby in the treatment tank 14.

Periodically, resin is transferred by gravity from the spent resin storage tank 19 into the top of a regeneration column 20. As described more fully in connection with FIG. 2 hereinafter, for some applications it is preferable that the resin be supplied to the regeneration column 20 under pressure and in those cases a feed column similar to the feed column 13 is interposed between the tank 19 and the regeneration column 20.

In order to maintain a constant flow of regenerant through the column 20, and also to minimize the cost of the system by eliminating the need for high pressure pumps, a constant head tank 21, which is supported at a substantially elevated position relative to the column 20, is provided and contains a supply of the liquid regenerant. This regenerant is thus fed under the force of gravity through a line or pipe 22 to the bottom of the regeneration tank 20 and having passed through the resin contained in the column 20 is conveyed by a line 23 into the bottom of the tank 19 wherein it preconditions the spent resin contained in the tank 19 and flows out through a weir 24 at the top of the tank 19 as a waste liquid and may be fed into the sewer or the like.

Periodically, the resin which has been regenerated in the column 20 is fed from the bottom of the column 20 to the top of a column 26 wherein it is once more treated with a full strength regenerant solution which is fed by gravity from the constant head tank 21 through a line or pipe 27 to the bottom of the column 26. Inasmuch as the resin which is supplied to the column 26 from the regeneration column 29 is substantially regenerated before it enters the column 26, it is for all practical purposes completely regenerated. However, a small amount of full strength regenerant is, nevertheless, passed through this resin to insure the complete regeneration thereof.

The regenerated resin is fed from the bottom of the column 26 into the top of a rinse column 29. Wateris passed upwardly through the column 29 and thus through the resin contained therein and flows out of the top of the column 29. The water having passed through the regenerated resin in the column 29 is a thin regeneration solution and it is mixed with concentrated regenerant in a mixing tee 31 and supplied to the tank 28. A pump 32 pumps regenerant from the tank 28 through a line 33 into a resin trap or strainer 34 from which it falls by gravity into the constant head tank 21.

It may thus be seen that spent resin from the ion exchange tank 14 passes seriatim through the tanks 15, 16, 17, 19, 20, 26, 29, 10 or 11, and 13 back into the top of the tank 14. During this movement of the spent resin through these tanks, which constitutes a regeneration loop, the $H^+$ ions which have been replaced with cations from the main stream liquid in the tank 14 are once more returned to the resin which is introduced into the top of the tank 14 as a freshly regenerated resin.

In operation, the system is pulsed periodically to simultaneously move small quantities of the resin through this regeneration loop. Since the resion is forced or pushed through the tanks 14, 15, 16, and 17 under pneumatic pressure these tanks are maintained in a completely full or "chock-a-block" condition at all times thus insuring a plug flow of resin therethrough. This is most important since for efficient operation of an ion exchange system and for that matter many other systems, where a liquid is being treated by a granular material, it is important that the spent or less efficient treating material not mix with or contaminate the fresh or less spent material. It may thus be seen that in the column 14, for example, the most completely used or spent resin is at the bottom of the column and the fresh resin is at the top, there being a gradual variation from the most usable resin at the top to the least usable at the bottom. With the system of the present invention this variation in degree of strength of resin is maintained at all times thereby insuring the most efficient use thereof. In the system described hereinafter in connection with FIG. 2, and in the present system, if a pressurizable feed column is connected between the tank column 19 and the regeneration column 20, the regeneration column 20 may also be maintained in a "chock-a-block" or completely filled condition at all times.

Considering the system of FIg. 1 in greater detail, regenerated resin from the bottom of the column 29 is supplied through a line or pipe 40 to a power operated swing pipe 41 which on each successive pulse of resin through the system swings from a feed position above one of the tanks 10 and 11 to a feed position above the other tank. In this way the tanks 10 and 11 are both maintained in relatively full condition. As mentioned hereinbefore, the cation exchanger illustrated in FIG. 1 is adapted for use in a demineralizer which includes a similar anion exchanger. Consequently, there is available in this overall system a cation bearing liquid which has passed through the anion exchange resin, and a small amount of this liquid is supplied through a line 42 and through a pair of valves 43 and 44 to the respective tanks 10 and 11 to precondition the the cation resin contained therein.

Referring now to the drawings, and particularly to FIG. 1 thereof, a pair of solenoid control valves 43 and 44 are respectively controlled by liquid level control devices 45 and 46 of any suitable type well known in the art which operate these valves to maintain predetermined liquid levels in the tanks 10 and 11.

As shown, the tanks 10 and 11 each have conical bottom portions which feed resin through respective solenoid control valves 47 and 48 to the feed column 13. Drain lines including solenoid control valves 49 and 50 are respectively connected to the tanks 10 and 11 near the bottoms thereof and lines including solenoid control valves 51 and 52 are provided for supplying air under pressure into the bottom portions of the tanks 10 and 11 for agitating the resin contained therein.

The resin feed valves 47 and 48 are under the control of a level sensing device 53, such as a "Bin-dicator" sold by The Bin-dicator Company of Detroit, Michigan, and are pariodically opened to maintain a given level of resin in the feed column 13. A vent line including a solenoid valve 55 is connected to the top of the feed column 13, and a high pressure air inlet line including a solenoid controlled valve 56 is connected to the top of the column 13. The valve 56 is periodically opened for a relatively short time such, for example, as thirty seconds during the resin transfer or pulse portion of the cycle and the high pressure air entering the top of the column 13 forces a given quantity of pulse of resin down through the feed column 13 and through a solenoid controlled resin feed valve 57 into the top of the treating column 14. As shown in the drawing, the column 14 has a conical upper end as well as a conical lower end and the juncture between the conical ends and the cylindrical main body portion has a smooth curvature, as illustrated at 58 and 59, to insure that there are no dead areas in the tank 14 where resin remains relatively stationary as the body of resin peridically moves downwardly through the column 14. A resin take-off line including a valve 61 is connected between the valve 57 and the top of the tank 14 to permit the removal of resin from the tank 14 for inspection or for maintenance of the tank.

The feed column 13 has a sufficiently large capacity to hold enough resin for several pulse cycles. Should, therefore, the lines from the preconditioning tanks 10 and 11 to the tank 13 become clogged, there is sufficient time available to unclog these lines without shutting down the entire system.

A vent line including a solenoid valve 62 is connected to the top of the column 14 and the liquid effluent from the tank 14 is taken out through a line including a solenoid control valve 63 and fed to a storage tank 64 from which it may be pumped by a pump 65 through a solenoid valve 66 into the main process line of the system. Recirculation from the pump 65 back into the tank 64 is provided through a valve 67 for reasons well known in the art.

Also connected to theline between the valve 57 and the treating column 14 is an air inlet line including a solenoid valve 68 which is controlled by a suitable pressure sensing device 70 which responds to an increase in pressure between the main stream liquid inlet line 71 and the inside of the column 14 to open the valve 68 to feed high pressure air into the top of the column 14. At this same time a solenoid valve 72 connected to the inlet line 71 is opened whereby momentarily a pressure reversal is applied across the inlet feed s ysem to the tank 14 to dislodge any material which may be clogging the opening therein and pass the dislodged material through the valve 72 to a suitable waste collector.

A solenoid valve 73 is connected in the line 71 to control the flow of main stream liquid into the column 14. The bottom of the column 14 is connected through a solenoid operated valve 75 and a resin feed line to the top of the sweetening-off column 15. The column 15 is smaller but shaped essentially the same as the column 14, and therefore, has smoothly curved side wall portions between the upper and lower conical ends and the cylindrical central portion.

The smoothly curved portions are preferably provided in a metal tank by annular bands of epoxy disposed within the tank over the seams between the conical and cylindrical tank portions.

An outlet line including a solenoid controlled valve 76 is provided through which the sweet water or diluted sugar bearing solution is taken off from the column 15, and a vent line including a solenoid valve 77 is also connected to the top of the column 15. A resin take-off line includinga valve 78 is connected between the feed valve 75 and the top of the column 15 for extracting resin for inspection and the like. Also, as in the case of the column 14, a pressured air inlet line including a solenoid valve is connected to the top and an auxiliary outlet line and valve are connected to the main inlet line to the column to momentarily reverse the pressure across the feed system to the tank 15 to dislodge any material which may have plugged the orifices therein.

A water inlet line including a solenoid valve 83 connects to the inlet feed system at the bottom of the tank 15 for passing rinse water or a sweetening-off solution upwardly through the column 15.

A solenoid operated resin feed valve 85 is connected between the bottom of the column 15 and the top of the column 16 for transferring resin to the column 16 during the pulse cycle, and a resin take-off line including a valve 86 is connected between the valve 85 and the column 16. Ammonium Hydroxide ($NH_4OH$) is fed through a valve 87 into a feed system located at the bottom of the column 16 and the liquid effluent in the form of a waste product is discharged from the top of the column 16. An air inlet line including a valve 90 and an outlet line including a valve 91 are provided for reversing the pressure across the inlet feed system.

A solenoid controlled resin feed valve 92 is connected between the bottom of the column 16 and the top of column 17 and a resin take-off line including a valve 93 is connected between the valve 92 and the column 17. A soft water inlet line including a solenoid operated valve 95 connects through a suitable feed system to the bottom of the column 17 and a waste effluent line including a line 96 connects to the top of the tank. Similarly, a vent line including a valve 97 is connected to the top of the column 17. A pressurized air inlet including a valve 99 connects to the top of the column 17 and an auxiliary outlet line including a valve 100 is connected to the main soft water inlet line to momentarily reverse the pressure across the feed system to the column 17 to unclog any plugged orifices therein. A solenoid operated resin feed valve 104 is connected between the bottom of the column 17 and the line 18 for controlling the feed of resin through the line 18 to the tank 19.

As shown, a solenoid operated resin feed control valve 106 is connected between the bottom of the tank 19 and the top of the regenerating column 20. An annular screen 107 is connected in the top of the tank 106 to prevent resin from flowing out the column 20 into the line 23. As shown, a solenoid valve 108 is connected in the line 23, and a pressurized air inlet line including a solenoid operated valve 109 is connected to the line between the tank 19 and the column 20 and is operated in conjunction with an exhaust valve 110 connected in a line to the bottom of the column 20 for introducing pulses of air to the top of the column 20 to reverse the flow through the feed line at the bottom of the column 20 to dislodge any material which may be plugging the orifices in the feed system. Consequently, a pressure sensing switch is connected in the regenerant feed line 22 to control these valves 109 and 110.

A valve 112 is connected in the line 22 and a flow regulator 114 may also be connected in the line 22 to maintain a constant flow of regenerant through the column 20. It may thus be seen that the regenerant flows from the constant head tank 21 through the line 22 into the bottom of the column 20 out through the top thereof through a line 23 into the bottom of the tank 19 and thence through a weir 24 to an outlet line including a control valve 115. A pH sensing device 116 is connected in the outlet line to monitor the acidity of the waste.

An air inlet line including a solenoid valve 118 is connected to the bottom of the column 20, and a control valve 119 is connected in a resin feed line 120 between the bottom of the column 20 and the top of the column 26. A hopper 121, open to the atmosphere, is mounted above the column 26 and is fed by the line 120. A valve 117 controls the feed of resin from the hopper 121 to the columm 26. A pressuirzed air inlet line including a solenoid valve 122 is connected to the top of the column 26, and a soft water inlet line including a solenoid valve 123 is connected to the bottom of the column 26. A regenerant outlet line including a solenoid operated valve 124 is connected between the top of the columb 26 and the regenerant tank 28 and a second regenerant outlet including a control valve 125 is connected between the bottom of the column 26 and the tank 28. A solenoid valve 126 is connected in the line 27 which feeds regenerant from the constant head tank 21 to the bottom of the column 26.

A solenoid operated resin feed valve 128 is connected between the bottom of the column 26 and the top of the rinse column 29 and a resin outlet valve 129 is connected between the bottom of the column 29 and the line 40 which connects to the swing pipe 41 above the resin conditioning tanks 10 and 11. An outlet line including solenoid operated regenerant control valves 131 and 132 is connected from the top of the tank 29 to the mixing tee 31 to carry the thin regenerant solution to the mixing tee from which it is transported by a line 133 to the tank 28. A control valve 135 is provided for controlling the supply of concentrated regenerant from a suitable storage source to the mixing tee 31 wherein it is mixed with the thin regenerant and supplied through the line 123 to the tank 28.

An air inlet line including a valve 136 is connected to the top of the column 29 and an auxiliary exhaust valve 138 connected to a water inlet line including a valve 137 connected to the bottom of the column 29 are provided. A line including a valve 139 also connects to the mixing tee 31 and supplies fresh water thereto thereby to control the strength of the regenerant in the tank 28. A suitable mixer 140 is provided in the tank 28 to maintain the regenerant in a homogeneous condition.

OPERATION

During the service portion of the operating cycle, the main stream inlet and outlet valves 73 and 63 are open and the main stream liquor passes through the feed system at the bottom of the ion exchange column 14 upwardly through the resin contained therein and out at the top through the valve 63 into the retention tank 64. At this same time, resin is being supplied to one of the conditioning tanks 10 or 11 whose water drain off valve 49 or 50 is opened. As the water is thus drained from the resin, the resin remaining in the respective tank is relatively dry. At this same time, the valve 55 in the vent line from the feed column 13 is open to vent the column 13 to the atmosphere.

During the service cycle while the main stream liquid is being deionized the exhausted resin in the column 15 is being sweetened off and spent ammonium hydroxide from the regeneration step on the anion loop in the system is being fed through the valve 87 into the bottom of the column 16. In this column the ammonium hydroxide is displacing metal cations such as magnesium, sodium and potassium from the cation resin and replacing it with the ammonium radical which is more readily replaced with hydrogen ions in the regeneration column 20. The effluent containing these metallic ions may be exhausted through the valve 88 to the sewer but is prefereably fed to a separator and then to a properly designed ammonium concentrating plant for subsequent resale as fertilizer or the like.

The treatment of the cation resin in the column 16 prior to its being regenerated in the column 20 serves another useful purpose. Since the mineral ions are all substantially replaced in the column 16, such ions are present only in the effluent from this column and are not present in the effluents from any of the other columns in the regeneration loop. Consequently, only the effluent from column 16 need be passed through the separators for removal and recovery of these minerals. The effluents from the other tanks may thus be treated as wastes and fed directly to the sewer after a simple pH adjustment.

At this same time and throughout the service portion of the cycle the valves 95 and 96 associated with the rinse tank 17 are open and soft water is being passed through the resin contained in the column 17 to rinse off any sugars or ammonia which may be contained therein. Soft water is necessary in this rinse since hard water would normally contain calcium which if contacted with the regenerant would precipitate out in the form of a calcium salt on the resin thereby fouling the resin. For example, if the regenerant is sulphuric acid, calcium sulphate would be deposited on the resin in the column 20. As is well known in the art, removal of calcium sulphate from the resin is extremely difficult and expensive.

The resin contained in the tank 19 is at this time being pre-conditioned by the weak regenerant passing out of the top of the column 20 and through the line 23 into the tank 19. Measurement of pH at this point indicates the degree of exhaustion of the regenerant and the flow of regenerant may thus be controlled by operation of the valve 112 in the inlet 22 to the regeneration column 20. This valve may, however, also be controlled by either a flow measuring device or by a liquid level device in the column 20.

The resin feed valve 119 is also open at this time and a suitable liquid level measuring device 113 controls the valve 106 to maintain a predetermined level of resin in the column 20. Inasmuch as gravity flow of resin from the column 20 to the column 26 is provided, it is necessary that the level of resin in the column 20 be at all times higher than the open end of the resin feed line 120. The valve 112 is maintained open at all times the system is in operation and therefore the regenerant continuously flows upwardly through the column 20 to replace the ammonium cations contained on the resin with hydrogen ions. Moreover, the constant head tank 21 is constantly supplied with regenerant solution via the pump 32 through the line 33 and a recirculation line 142 is provided to maintain circulation in the tank 21 and also in the regenerant tank 28.

During the service step, as the resin feeds into the tank 26 from the hopper 121 it physically displaces relatively unused regenerant which exists from the column through the valve 124 and is returned to the regenerant tank 28 for reuse. During the service step a continuous supply of regenerant is supplied to the column 26 through the valve 126 connected in the line 27 from the constant head tank 21.

Water is introduced into the column 29 through the valve 137 and while passing through the resin picks up a certain amount of the regenerant which was carried into the tank 29 from the column 26. This dilute regenerant is usable and is thus fed through the valve 131 and the valve 132 into the mixing tee 31 from which it is supplied through the line 133 to the regenerant tank 28 for reuse. This dilute or "thin" regenerant is blended with fresh water supplied through the valve 139 to dilute full strength regenerant which is supplied through the valve 135 to the mixing tee 31 to continuously supply make-up regenerant to the tank 28. The service step may have a duration of approximately 3 minutes.

The second step in the overall cycle is known as the "prepare to pulse" step and during this time air is introduced to one of the tanks 10 and 11 through one of the respective valves 51 or 52 to agitate the resin prior to the following pulse transfer step. At this time the swing pipe 41 remains in the same position as in the service step and the air inlet valve 56 is open to pressurize the feed column 13 for approximately 5 seconds. The pressure in column 13 may be about 50 p.s.i.g. at this time. The valves associated with the columns 14, 15, 16, and 17 remain in the same conditions as in the service step but the valve 106 between the tank 19 and the regeneration column 20 is opened to allow resin from the tank 19 to begin to drop into the column 20. At this same time, the valve 119 at the bottom of the column 20 is closed to cut off the flow of regenerated or slurried regenerant to the hopper 121 which feeds the column 26. The valves 124, 125 and 126 are closed and the valves 123 and 128, all associated with the column 26, remain closed. The air inlet valve 122 is, however, open to pressurize the column 26. The valves associated with the other tanks remain in the same condition.

The third step in the overall cycle when quantities of resin actually transferred from one tank to another is known as the pulse step and takes approximately 30 seconds. During the pulse step the swing pipe 41 swings to the other one of the tanks 10 or 11 and one of the feed valves 47 or 48 opens allowing preconditioned resin to fall under the force of gravity into the column 13. Air under pressure of, for example, 15 p.s.i. continues to enter the column 13 for pressurization thereof through the valve 56. The resin feed valve 57 at the bottom of the column 13 and the other resin feed valves 75, 85, 92 and 104 are also open at this time allowing preconditioned resin to move under the pneumatic force exerted at the top of the column 13 into the column 14. Since the other resin feed valves 75, 85, 92 and 104 are all open at this same time, as the resin is forced under pressure into the top of the column 14 an equal amount of resin is forced from the bottom of the column 14 into the top of the column 15 which in turn forces resin into the top of the column 16 and out of the bottom of column 16 into the top of column 17, and from the bottom of column 17 through the line 18 into the tank 19. As indicated, the duration of this step is approximately thirty seconds and may be varied by adjusting the pressure and amount of air entering the column 13 through the valve 56.

During the pulse step, small quantities or pulses of resin are transferred from the tank 13 to the tank 14, from the tank 14 to the tank 15, from the tank 15 to the tank 16, from the tank 16 to the tank 17, and from the column 17 to the tank 19. All of these columns, however, remain completely full of resin at all times except, of course, for the small voids between the resin granules. However, there is no space through which the resin granules can move relative to the other granules as in the prior art system which require a void in these columns. The advantage of the "chock-a-block" condition of these columns at all times is that the true plug flow is achieved and there is no slamming of the resin column against the top of the tank or hardware contained therein to break down the granules and thus result in substantial attrition of the resin. As a safety feature, level detectors may be provided in each of the columns 17, 16, 15, and 14 to override the control of the resin feed valves between the respective columns to assure that the respective columns will not return to the service step unless they are completely filled with resin. When the columns are all returned to the service step, the valve 119 is also closed and remains closed for a brief period of time to stabilize the resin in the column 20.

At this time the air pressure inlet valve 122 on the column 26 is open and the resin feed valve 128 at the bottom of column 26 is also open whereby the resin in the column 26 is forced through the valve 128 into the column 29 and since the valve 129 is also open at this time the resin from the bottom of the column 29 is forced through the line 40 to the swing pipe 41 from which it is fed to the resin conditioning tank 11. The water inlet valve 123 to the column 26 is also open at this time to add liquid to the resin to facilitate the movement thereof through the tank 29 and the line 40. When one pulse of resin has passed out of the column 29 as measured by the time interval, the valve 129 is closed and as soon as the level control device 134 at the top of the column 29 indicates that the column is full, the valve 128 closes.

The system is now in a prepare-to-return to service condition with the swing pipe 41 in the new position and the valve 43 open so that treated liquor flows into the empty resin tank 10. The valve 49 may also be open at this time so that the tank is rinsed down. This step lasts approximately ten seconds. With the system in full service operation, and the swing pipe feeding resin to one of the conditioning tanks 10 or 11, the valve 43 or 44 to the other pre-conditioning tank is closed and the other valve 43 or 44 is open to feed the preconditioning liquid from the line 42 into the tank being filled for mixture with the resin supplied thereto from the column 29. The open valve 43 or 44 closes when its associated liquid level indicator 45 or 46 indicates that the level in the tank is at a predetermined position.

In the following table there is illustrated the sequence of operations of the various valves in the system of FIG. 1 as described above.

| Valve number | Function | Service | Prepare to pulse | Pulse | Prepare to return to service | Service |
|---|---|---|---|---|---|---|
| 43, 44 | Deionized liquor to cond. tank | X | | | | |
| 51, 52 | Agitate air in | | X | | | |
| 47, 48 | Resin move | | | X | | |
| 49, 50 | Water drain 10–11 | X | | | X | X |
| | Swingpipe | 10 | 10 | 11 | 11 | 11 |
| 56 | Air in | | X | X | | |
| 57 | Resin move | | | X | | |
| 55 | Vent | | | | X | |
| 61 | Resin off—13 | X | | | X | X |
| 63 | Liquor out | X | | | X | X |
| 73 | Liquor in | X | | | X | X |
| 75 | Resin move | | | X | | |
| 62 | Vent | | | | X | |
| 78 | Resin off—14 | | | | | |
| 76 | Sweet water out | X | | | X | X |
| 83 | Sweet water in | X | | | X | X |
| 85 | Resin move | | | X | | |
| 77 | Vent | | | | | |
| 106 | Resin move | | X | X | | |
| 108 | Weak regenerant in | X | X | X | X | X |
| 112 | Regenerant in | X | X | X | X | X |
| 119 | Regenerant move | X | | | X | X |
| 118 | Air mix | | | | | |
| 137 | Water in | X | | | X | X |
| 122 and 136 | Air pressure | | X | X | | |
| 124 | Vent | X | | | | |
| 117 | Resin in | X | | | X | X |
| 125 and 131 | Rinse | X | X | | X | X |
| 128 and 129 | Resin move | | | X | | |
| 126 | Regenerant in | X | | X | X | X |
| 123 | Water in | | | X | X | X |
| 139 | Feed water make-up | X | X | X | X | X |
| 132 | Weak regenerant make-up | X | X | X | X | X |
| 88 | Exhaust NH₃ | X | | | X | X |
| 87 | NH₃ in | X | | | X | X |
| 92 | Resin move | | | X | | |
| 89 | Vent | | | | | |
| 93 | Resin off—16 | | | | | |
| 96 | Rinse to sewer | | | | | |
| 95 | Rinse in | X | | | X | X |
| 104 | Resin move | | | X | | |
| 97 | Vent | | | | | |
| 105 | Resin off—17 | | | | | |
| | Power operated swingpipe to 10 and 11 | 10 | 10 | 11 | 11 | 11 |

ALTERNATIVE EMBODIMENT

As indicated hereinabove, the present invention finds application as a simple water softener in the softening of water as well as in the more complex demineralizing systems such as that disclosed in FIG. 1. When, of course, the system is used for simple water softening, the columns 15, 16, and 17 of FIG. 1 would be eliminated and the regenerant might be a sodium chloride solution. In FIG. 2, there is shown a portion of the regeneration loop of a water softening system embodying the present invention. In this system, spent resin is supplied during the pulse cycle from the ion exchange column to a storage tank 145 which is connected by a resin feed valve 146 to the top of a pressurizable feed column 147 which is adapted to be supplied with pressurized air through a feed valve 148 connected in a line operning into the top of the column 147. A vent line including a valve 149 is also connected to the column 147. A resin feed valve 150 connects between the bottom of the feed column 147 and the top of a regeneration column 152. The column 152 is provided with a liquid feed system 154 located at the bottom and supplied with water through a control valve 156. A liquid exhaust system 158 is mounted in the top of the column 152 and is connected to an effluent line including a control valve 160. Approximately half-way up the column 152 is another liquid feed system 162 through which the regenerant is supplied through a control valve 164 and a flow regulator 166. The regenerant may, of course, be a solution of sodium chloride, the most common regenerant for water softening resins such as Zeolite and the like. The regenerant is shown in FIG. 2 as being fed to the approximate center of the column 152 but the exact location of the feed system 152 will vary with the particular application, the size of the column 152, the flow rates and the like.

It may be seen that as the resin is pulsed downwardly through the column 152, the degree to which the resin has been regenerated increases from the top of the column to the bottom. With this system, a single column is used for continuous rinsing and regeneration of the resin. It may be seen that the resin located below the regenerant feed system 167 is rinsed since the water entering through the feed system 144 at the bottom passes upwardly therethrough it. The concentration of the sodium chloride solution which is supplied to the feed system 162 is, therefore, adjusted so that when mixed with the water flowing upwardly through the resin from the feed system 152 the proper concentration is provided for regeneration of the resin contained in the column above the feed system 162. Hence, the separate regeneration and rinse columns and associated valves and lines are eliminated thereby greatly simplifying the overall system and reducing the cost thereof.

The inlet and outlet feed systems which are mounted respectively in the bottoms and tops of the columns 14, 15, 16, 17, 26 and 29 may be the so-called "rim and radial" distributors described in copending application, Ser. No. 719,154 filed Apr. 5, 1968 by James F. Zievers and Henry Schmidt, Jr., now U.S. Pat. No. 3,556,299, and assigned to the same assignee as the present invention. Of course, other feed systems such as peripheral lances and the like may be used so long as they do not interfere with the passage of the granular material through the columns. An advantage of the "rim and radial" distributor is that they line substantially against the end walls of the columns out of the path of resin movement.

While the present invention has been described in connection with particular embodiments thereof, it will be understood that many changes and modifications of this invention may be made by those skilled in the art without departing from the true spirit and the scope thereof. Accordingly, the appended claims are intended to cover all such changes and modifications as fall within the true spirit and scope of the present invention.

What is claimed is:

1. A system for treating a liquid with a granular sorbent, comprising
   a first vessel substantially filled with a granular sorbent,
   normally closed upper and lower valves for said vessel through which said granular sorbent may be, respectively, supplied and removed from said vessel,
   a receptor into which said lower valve discharges,
   a second vessel containing a quantity of said granular sorbent and which discharges through said upper valve into said first vessel,
   means for passing said liquid through said first vessel wherein said liquid is treated with said granular sorbent contained therein,
   means for interrupting the flow of liquid through said first vessel, applying gas under pressure to said second vessel and opening said upper and lower valves to laminarly push granular sorbent from said second vessel into the top of said first vessel and to push granular sorbent from the bottom of said first vessel to said receptor while maintaining said first vessel substantially filled with granular sorbent.

2. A system for treating a liquid with a granular sorbent and for treating said sorbent with a liquid, comprising in combination
   a service column completely filled with a quantity of said sorbent and having a liquid inlet and a liquid outlet used for passing a liquid to be treated through said sorbent and a sorbent inlet at the top and a sorbent outlet at the bottom,
   a regenerating column having an inlet and an outlet and wherein said sorbent is treated after becoming spent,
   an unpressurized buffer tank positioned above said service column for storing sorbent after treatment thereof in said regenerating column,
   transfer means connected between said outlet of said regenerating column and said buffer tank for transferring treated sorbent from said regenerating column to said buffer tank,
   a pressurizable feed column disposed between said buffer tank and said service column and having a sorbent inlet at the top and s sorbent outlet at the bottom,
   first valve means connected between said sorbent inlet of said feed column and an outlet of said buffer tank,
   second valve means connected between said sorbent outlet of said feed column and said sorbent inlet of said service column,
   third valve means connected between said sorbent outlet of said service column and said inlet of said regenerating column,
   fourth valve means connected between the top of said feed column and a source of pressurized air for intermittently increasing the pressure in said feed column to a value exceeding the pressure in said service column, and
   means for intermittently interrupting the flow of liquid through said service column and opening said second and third valve means for a predetermined period of time to push a predetermined quantity of sorbent from said feed column to the top of said service column and simultaneously to push an equal quantity of sorbent out of the bottom of said service column while maintaining said service column completely filled with sorbent at all times,
   whereby said sorbent is laminarly pushed in intermittent steps down through said service column without any substantial intermixing of the sorbent in said feed column.

3. A system according to claim 2 further comprising
a second unpressurized buffer tank interposed between said third valve means and said regenerating column.

4. A system according to claim 3 further comprising
a second pressurizable feed column disposed above said regenerating column and below said second buffer tank,
fifth valve means interposed between said second buffer tank and said regenerating column, and
means for intermittently pressurizing said second feed column by introducing gas into the top thereof and opening said fifth valve means to transfer a quantity of sorbent from said second buffer tank to said regenerating column.

5. A system according to claim 4 wherein
said means for intermittently pressurizing said second feed column and said valve means are synchronized simultaneously to transfer sorbent through said service and regenerating column.

6. A system for treating a liquid with a granular sorbent, comprising
a pressurizable feed column for holding a quantity of said granular sorbent,
a pressurizable treating column sealable from said feed column and completely filled with said granular sorbent,
a liquid inlet to said treating column for supplying the liquid to be treated to said treating column,
means including a valve connected between an outlet at one end of said feed column and an inlet at one end of said treating column for transferring sorbent from said feed column to said one end of said treating column,
a sorbent outlet at the opposite end of said treating column,
valve means connected to said last-named outlet for controlling the flow of sorbent from said treating column,
means for pressurizing the space above said granular sorbent in said feed column and opening said valves to move sorbent from said feed column to said treating column, to move sorbent out of said treating column and to provide laminar flow of sorbent through said treating column while maintaining said treating column substantially completely filled with said sorbent,
means for increasing the pressure in said treating column to a value exceeding the pressure at said inlet,
a liquid outlet line, and
valve means connecting said liquid inlet to said liquid outlet line during said increase in pressure in said treating column to reverse the flow of liquid through said inlet.

7. A system for treating a liquid with a granular sorbent and for treating said sorbent with a liquid, comprising in combination
a service column completely filled with a quantity of said sorbent and having a liquid inlet and a liquid outlet used for passing a liquid to be treated through said sorbent and a sorbent inlet at the top and a sorbent outlet at the bottom,
a regenerating column having an inlet and an outlet and wherein said sorbent is treated after becoming spent,
an unpressurized buffer tank positioned above said service column for storing sorbent after treatment thereof in said regenerating column,
trnasfer means connected between said outlet of said regenerating column and said buffer tank for transferring treated sorbent from said regenerating column to said buffer tank,
a pressurizable feed column disposed between said buffer tank and said feed column and having a sorbent inlet at the top and a sorbent outlet at the bottom,
first valve means connected between said sorbent inlet of said feed column and an outlet of said buffer tank,
second valve means connected between said sorbent outlet of said feed column and said sorbent inlet of said service column,
third valve means connected between said sorbent outlet of said service column and said inlet of said regenerating column,
fourth valve means connected between the top of said feed column and a source of pressurized air for intermittently increasing the pressure in said feed column to a value exceeding the pressure in said service column,
means for intermittently interrupting the flow of liquid through said service column and opening said second, third and fourth valve means for a predetermined period of time to transfer a predetermined quantity of sorbent from said feed column to the top of said service column and simultaneously to transfer an equal quantity of sorbent out of the bottom of said service column while maintaining said service column completely filled with sorbent at all times,
means for increasing the pressure in said service column to a value exceeding the pressure at said liquid inlet to said service column while maintaining said liquid outlet closed, thereby to reverse the flow of liquid through said inlet, and
whereby said sorbent is moved in intermittent steps down through said service column without any substantial intermixing of the sorbent in said feed column.

8. A system for treating a liquid with a granular sorbent and for treating said sorbent with a liquid comprising in combination
a service column completely filled with a quantity of said sorbent and having a liquid inlet and a liquid outlet used for passing a liquid to be treated through said sorbent and a sorbent inlet at the top and a sorbent outlet at the bottom,
a regenerating column having an inlet and an outlet and wherein said sorbent is treated after becoming spent,
an unpressurized buffer tank positioned above said service column for storing sorbent after treatment thereof in said regenerating column,
transfer means connected between said outlet of said regenerating column and said buffer tank for transferring treated sorbent from said regenerating column to said buffer tank,
a pressurizable feed column disposed between said buffer tank and said feed column andhaving a sorbent inlet at the top and a sorbent outlet at the bottom,
first valve means connected between said sorbent inlet of said feed column and an outlet of said buffer tank, second valve means connected between said sorbent outlet of said feed column and said sorbent inlet of said service column, third valve means connected between said sorbent outlet of said service column and said inlet of said regenerating column, fourth valve means connected between the top of said feed column and a source of pressurized air for intermittently increasing the pressure in said feed column to a value exceeding the pressure in said service column, means for intermittently interrupting the flow of liquid through said service column and opening said second, third and fourth valve means for a predetermined period of time to transfer a predetermined quantity of sorbent out of the bottom of said service column while maintaining said service column completely filled with sorbent at all times, wherein a plurality of said buffer tanks are provided, means for alternately supplying sorbent to said buffer tanks upon successive transfers of said predetermined quantities of said sorbent through said service column, and means for alternately supplying sorbent from said buffer tanks to said feed column upon successive transfers of said predetermined quantities of said sorbent through said service column.

* * * * *